Aug. 31, 1943. L. F. ROMINE 2,328,497
WINDING
Filed April 29, 1940 2 Sheets-Sheet 1
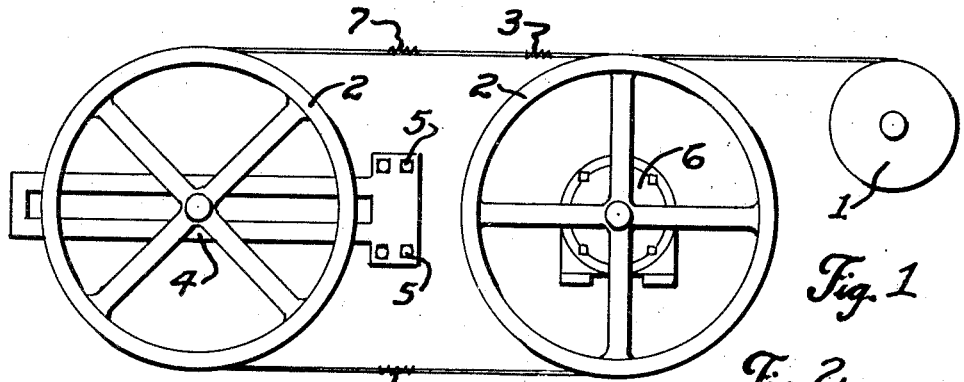
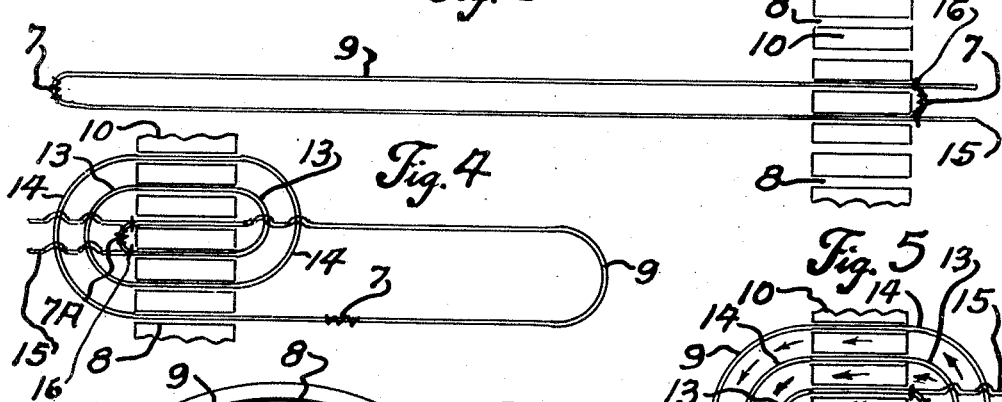
INVENTOR:
Lawrence F. Romine.
By Grover C. Hill,
ATTORNEY.

Aug. 31, 1943.　　　　L. F. ROMINE　　　　2,328,497
WINDING
Filed April 29, 1940　　　　2 Sheets-Sheet 2

Inventor:
Lawrence F. Romine
By Zabel, Carlson, Gritzbaugh and Wells
Attorneys.

Patented Aug. 31, 1943

2,328,497

UNITED STATES PATENT OFFICE 2,328,497

WINDING

Lawrence F. Romine, Detroit, Mich.

Application April 29, 1940, Serial No. 332,196

2 Claims. (Cl. 171—206)

The present invention relates to improvements in windings, such as are adapted for electric motors, transformers, generators, and the like, and provides a particular winding construction whereby a higher efficiency is attained, the winding being such as to decrease the current drawn by a motor at no load and to make the power factor higher.

This winding has no spliced connections between each north and south pole, and it is not necessary to make any connections during the process of installing this type of winding in electric motors.

Another important advantage of the invention is that instead of a single wire or path connecting pole to pole a plurality of wires is used and the winding carries the current through all wires which are within the customary slots of the motor frame, traveling from the last slot of one pole to the first slot of the next pole, thereby providing a greater path through which electricity may flow more freely, also the frequency change which is usually approximately sixty cycles per second is allowed to take place in both poles with greater ease and uniformity without excessive current losses.

With the foregoing in mind, it will become readily apparent that the invention possesses further advantages, all of which will be clearly revealed during the course of the following detailed description, illustrated throughout the accompanying drawings, and more fully pointed out in the appended claims.

With reference to the drawings:

Figure 1 shows the system of grooved wheels on which my coil windings are formed, and the method by which the coils are formed.

Figure 2 shows the coil after being formed by the method indicated in Figure 1, with cross-connection, ready for compression.

Figure 7:
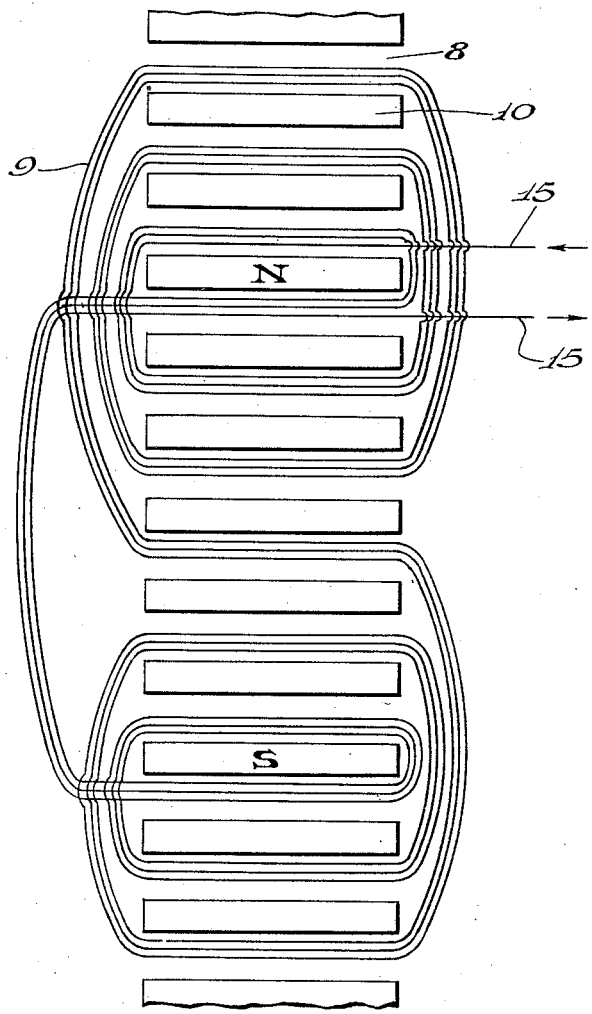

Figure 3 indicates the coil compressed and being inserted into two of the slots of the motor.

Figure 4 shows the winding as wound in the slots of one complete pole.

Figure 5 shows the winding in the entire motor containing two poles for one phase.

Figure 6 is a view showing the end of the complete motor with end bell thereof being removed.

Figure 7 is a diagrammatic view showing the same structure as is illustrated in Figure 5 but with the individual wires of the coil shown separated in order that they may be more readily traced.

In carrying out my invention, and referring more particularly to Figure 1, the method for forming this type of winding uses a reel 1 which contains a quantity of the desired wire and from this reel the wire is wound around grooved wheels 2, the end of said wire first being connected as at 3 to an adjacent turn to hold it in place and to locate it for later attachment of a lead-in wire. Wheels 2 are longitudinally adjustable with respect to each other by means of a slotted arm 4 which is secured by bolts 5 to any suitable anchorage.

Wheels 2 are driven by a slow speed gear motor 6.

The coil is then formed to any number of turns and markers 7 are installed on the coil at points equi-distant from each other in both directions around the coil to aid in installing the winding in the motor frame so as to determine when each pole has taken up its portion of the winding. Leads 15 are tied to the opposite ends of the wire of coil 9 as at 16.

The coil is then removed from wheels 2 and is flattened as shown in Fig. 2 with the leads 15 at one end and one of the markers 7 at each end in order that the part of the coil having the leads 15 thereon may be inserted within two of slots 8 as in Figure 3.

The arrangement of coil 9 with respect to slots 8 is clearly shown in Figures 5 and 6. The motor frame or iron is indicated at 10, the air gap at 11, and the inductors at 12.

Referring to Figure 4, the winding shows the same as wound in one complete pole. A portion of the wire is first inserted within two of slots 8 and is looped as at marker 7A. The loop part coming out of one of the slots is passed over the loop part coming out of the other slot and is wound in loops 13 and 14 which are inserted in the appropriate slots 8. The part of the coil remaining is then bent over to the slots forming the next pole in the manner shown in Fig 5. (Note: Fig. 5 is reversed with respect to Fig. 4 so that the leads 15 project from the righthand side instead of the lefthand side as shown in Fig. 4). The part of the coil passing out of the outer slot of the first pole is taken directly across the end of the first pole to the first outer slot of the second pole and is wound inwardly to the center slots. The coil emerges from one of the center slots of the pole and goes directly to the corresponding center slot of the first pole.

This invention also covers the fact that the winding may be formed with a plurality of open slots 8 for additional windings or regrouping of the windings intermediate the coils or intermediate the poles. This form is adapted for additional phases or split phases, but is not indicated in the drawings.

With reference to Figure 6, in showing air gap 11 it is understood that all air gaps are variable according to various bearing conditions and manufacturing operations in grinding the same, also variation in qualities in the iron used, although the air gap in Figure 6 is concentrically indicated.

In this form of winding the turns of the wire are uniform, each turn passing from one pole to the next pole or through the entire motor before reaching the next turn, thereby electrically balancing the circuit close to one hundred percent, and constituting means for absorbing all iron and air gap irregularities.

While two poles are illustrated in the drawings it is understood that any number of such poles may be likewise formed and used. And it is further understood that any number of devices for forming the coils such as shown in Figure 1 may be used.

In winding a three-phase motor three coils as shown in Figure 2 may be made in a single operation, thus greatly facilitating the manufacture of this type of winding. Each phase of course is individually wound to aid in winding 120 electrical degrees, as in a three-phase motor.

This type of winding may also be used for a six-phase, two-phase, and split-phase, and shaded pole motors, which will facilitate matters in production manufacturing.

I have not illustrated each and every design that may be formed as result of this winding, but described the simplest possible construction such as is illustrated in the drawings.

These coils are constructed so as to be undless, thus eliminating the necessity of connections throughout the entire phase, such as soldered joints which are liable to melt and disconnect thereby causing the motor to burn out. There are also no coil knuckles required.

By balancing the electric circuit equally there is less heat present in this type of winding construction, thus greatly increasing the life of the motor by equally balancing the differentials of iron and air gap.

This winding construction produces a higher power factor both with and without the load.

Referring to Figures 5 and 7, the path of electricity is clearly indicated in these views; it flows evenly through each turn covering the entire motor frame or phase and then returning to the adjacent turn, and this is repeated for as many turns according to the design. The electrical energy is returned over the negative lead.

The present arrangement of the winding in the slots of the pole faces is of particular advantage in that it employs the minimum amount of conductor between the two pole faces of opposite polarity. There is only one jumper portion of the coil, this being the portion that extends from a slot adjacent the center of one pole face to the corresponding slot adjacent the center of the other pole face. In the form shown, this section of the coil only has to cross other sections of the coil five times. This makes the windings more simple. Furthermore, only one cross-over lead needs to be taped. There is a very small build-up or "biscuit" at the side of the motor and the maximum amount of the flux path is thus concentrated in the iron of the pole piece. This novel winding has the further advantage that in the coil itself the connections are from the center or point of highest flux concentration of one pole face to the center or point of highest flux concentration of the other pole face. The other connection completing the coil is from the outer or point of lowest flux concentration of one pole face to the outer or point of lowest flux concentration of the opposite pole face.

And lastly, an advantage not to be overlooked, is the fact that this type of winding will cause the motor to operate more silently.

Having thus fully described my invention, what I claim as new is:

1. The method of winding a multipolar distributed winding of the class described, formed with a skein consisting of a plurality of turns between terminal leads, comprising the steps of introducing a length of skein into a central pole slot, winding the skein spirally into successive adjacent slots to an outer slot, running a length of the skein from one of said slots to the corresponding slot of an adjacent pole, and winding the skein spirally through the remaining slots of said adjacent pole.

2. The method of winding a multipolar distributed winding of the class described, formed with a skein consisting of a plurality of turns between terminal leads, comprising the steps of introducing a length of skein into a central pole slot, winding the skein spirally into successive adjacent slots to an outer slot, running a length of the skein leading from the central pole slot to a central pole slot of an adjacent pole, and winding the skein outwardly spirally through the remaining slots of said adjacent pole.

LAWRENCE F. ROMINE.